United States Patent
Moss et al.

(10) Patent No.: US 12,529,776 B2
(45) Date of Patent: Jan. 20, 2026

(54) VEHICLE RADAR SYSTEM

(71) Applicant: Veoneer Sweden AB, Vårgårda (SE)

(72) Inventors: Jonathan Moss, Unterschleissheim (DE); Martin Fuchs, Unterschleissheim (DE); Hansjerg Goelz, Unterschleissheim (DE)

(73) Assignee: Magna Electronics Sweden AB, Vargarda (SE)

( * ) Notice: Subject to any disclaimer, the term of this patent is extended or adjusted under 35 U.S.C. 154(b) by 222 days.

(21) Appl. No.: 18/255,903

(22) PCT Filed: Dec. 3, 2021

(86) PCT No.: PCT/EP2021/084196
§ 371 (c)(1),
(2) Date: Jun. 5, 2023

(87) PCT Pub. No.: WO2022/122589
PCT Pub. Date: Jun. 16, 2022

(65) Prior Publication Data
US 2024/0077599 A1    Mar. 7, 2024

(30) Foreign Application Priority Data

Dec. 8, 2020 (EP) .................... 20212568

(51) Int. Cl.
  *G01S 13/536* (2006.01)
  *G01S 13/34* (2006.01)
  *G01S 13/931* (2020.01)
(52) U.S. Cl.
  CPC .......... *G01S 13/536* (2013.01); *G01S 13/343* (2013.01); *G01S 13/931* (2013.01)
(58) Field of Classification Search
  CPC ..... G01S 13/343; G01S 13/536; G01S 13/931
  See application file for complete search history.

(56) References Cited

U.S. PATENT DOCUMENTS 4,302,758 A * 11/1981 Tomasi ................. G01S 13/343
                                                    342/87
5,652,589 A *  7/1997 Ono ..................... G01S 13/345
                                                    342/79
(Continued)

FOREIGN PATENT DOCUMENTS

WO     2005062072 A1    7/2005

OTHER PUBLICATIONS

International Search Report and Written Opinion of PCT/EP2021/084196, mailed Mar. 25, 2022.

*Primary Examiner* — Peter M Bythrow
(74) *Attorney, Agent, or Firm* — DICKINSON WRIGHT PLLC

(57) ABSTRACT

A vehicle radar system (3) adapted to be placed in an ego vehicle (1) and comprising a control unit (4) and at least one transceiver arrangement (5) arranged to generate and transmit an FMCW signal (6; 6a, 6'a; 6b, 6'b) and to receive reflected signals (7) that have been reflected by one or more target objects (14, 15), each target object having an associated determined target object velocity ($v_2$, $v_3$). The FMCW signal (6) comprises a corresponding plurality of frequency ramps ($r_1$, $r_2$), where each one has a certain duration time ($t_{r1}$, $t_{r2}$). The control unit (4) is adapted to control the transceiver arrangement (5) to generate at least two pluralities (6a, 6'a; 6b, 6'b, 6c, 6'c) of ramps ($r_1$, $r_2$). The ramps ($r_1$) in each plurality (6a, 6'a) of ramps ($r_1$) are adapted to have a ramp period time ($t_{T1}$) that differs from the ramp period time ($t_{T2}$, $t_{T3}$, $t_{T4}$) in all other pluralities (6b, 6'b, 6c, 6'c) of ramps ($r_1$, $r_2$). The ramp period times ($t_{T1}$, $t_{T2}$, $t_{T3}$, $t_{T4}$) are based on a determined ego vehicle velocity ($v_1$), the determined target object velocity ($v_2$, $v_3$), or a combination of both.

16 Claims, 6 Drawing Sheets

(56) References Cited

U.S. PATENT DOCUMENTS

| | | | | |
|---|---|---|---|---|
| 6,577,269 B2* | 6/2003 | Woodington | G01S 13/865 | 342/72 |
| 8,390,506 B2* | 3/2013 | Focke | G01S 13/931 | 342/112 |
| 8,405,541 B2* | 3/2013 | Lee | G01S 13/0209 | 342/128 |
| 8,599,062 B2* | 12/2013 | Szajnowski | G01S 13/345 | 342/104 |
| 9,389,306 B2* | 7/2016 | Nogueira-Nine | G01S 7/418 | |
| 9,791,549 B2* | 10/2017 | Bi | G01S 13/343 | |
| 10,001,556 B2* | 6/2018 | Yukumatsu | G01S 7/35 | |
| 10,067,221 B2* | 9/2018 | Ginsburg | G01S 7/40 | |
| 10,203,406 B2* | 2/2019 | Yamashina | G01S 13/345 | |
| 10,557,931 B2* | 2/2020 | Schoor | G01S 13/584 | |
| 11,740,345 B2* | 8/2023 | Narayana Moorthy | G01S 13/222 | 342/112 |
| 2002/0044082 A1* | 4/2002 | Woodington | H01Q 13/10 | 342/128 |
| 2003/0052813 A1* | 3/2003 | Natsume | G01S 13/345 | 342/107 |
| 2005/0285773 A1* | 12/2005 | Hartzstein | H01Q 1/3233 | 342/107 |
| 2008/0024353 A1 | 1/2008 | Schneider | | |
| 2012/0092209 A1* | 4/2012 | Nakagawa | G01S 13/584 | 342/109 |
| 2012/0235857 A1* | 9/2012 | Kim | G01S 13/931 | 342/134 |
| 2014/0022111 A1* | 1/2014 | Kuehnle | G01S 13/343 | 342/109 |
| 2015/0002332 A1* | 1/2015 | Bi | G01S 13/02 | 342/385 |
| 2015/0331096 A1* | 11/2015 | Schoor | G01S 13/345 | 342/112 |
| 2016/0131742 A1* | 5/2016 | Schoor | H01Q 21/22 | 342/128 |
| 2016/0139257 A1* | 5/2016 | Yamashina | G01S 7/354 | 342/109 |
| 2017/0115386 A1* | 4/2017 | Morinaga | G01S 13/931 | |
| 2017/0131393 A1* | 5/2017 | Schoor | G01S 13/42 | |
| 2017/0146647 A1* | 5/2017 | Lim | G01S 7/352 | |
| 2018/0095162 A1* | 4/2018 | Fetterman | G01S 7/023 | |
| 2018/0136328 A1* | 5/2018 | Moss | G01S 7/354 | |
| 2018/0149735 A1* | 5/2018 | Lim | H01Q 21/0075 | |
| 2018/0356495 A1* | 12/2018 | Moss | G01S 7/021 | |
| 2019/0212428 A1* | 7/2019 | Santra | G01S 7/4865 | |
| 2019/0285725 A1* | 9/2019 | Roger | G01S 7/023 | |
| 2019/0310359 A1* | 10/2019 | Lee | G01S 13/0218 | |
| 2019/0353770 A1* | 11/2019 | Schoor | G01S 13/583 | |
| 2019/0391247 A1* | 12/2019 | Gulati | G01S 13/341 | |
| 2020/0033442 A1* | 1/2020 | Gulati | H04K 3/25 | |
| 2020/0041642 A1* | 2/2020 | Mazeau | G01S 7/352 | |
| 2020/0057136 A1* | 2/2020 | Doescher | G01S 13/584 | |
| 2020/0341131 A1* | 10/2020 | You | G01S 13/931 | |
| 2021/0003695 A1* | 1/2021 | Akamine | G01S 7/411 | |
| 2021/0055413 A1* | 2/2021 | Engewald | H04B 1/0483 | |
| 2022/0252697 A1* | 8/2022 | Rennhard | G01V 3/12 | |
| 2022/0308204 A1* | 9/2022 | Zaidi | G01S 13/426 | |
| 2023/0152437 A1* | 5/2023 | Kai | G01S 13/343 | 342/112 |
| 2024/0201358 A1* | 6/2024 | Yu | G01S 13/42 | |

* cited by examiner

# VEHICLE RADAR SYSTEM

CROSS-REFERENCE TO RELATED APPLICATIONS

This application is a 35 U.S.C. § 371 national phase of PCT International Application No. PCT/EP2021/084196, filed Dec. 3, 2021, which claims the benefit of priority under 35 U.S.C. § 119 to European Patent Application No. 20212568.8, filed Dec. 8, 2020, the contents of which are incorporated herein by reference in its entirety.

FIELD OF THE INVENTION

The present disclosure relates to a vehicle radar system comprising at least one transceiver arrangement arranged to generate, transmit a least one FMCW (Frequency Modulated Continuous Wave) chirp signal, and to receive reflected signals.

BACKGROUND

Many vehicle radar systems comprise means for generating so-called chirp signals that are transmitted, reflected and received by means of appropriate antennas comprised in the radar system. A chirp signal is an FMCW (Frequency Modulated Continuous Wave) signal with a certain amplitude where the frequency is continuously ramped between two values, the chirp signal thus being in the form of a continuous sinusoid where the frequency varies from a first low frequency to a second high frequency over the course of the ramp.

The received signals, thus constituted by reflected radar echoes, are mixed with the transmitted chirp signal in order to convert the received signals to baseband signals. These baseband signals, or IF (Intermediate Frequency) signals, are amplified and transferred in a plurality of channels to an Analog Digital Converter (ADC) arrangement which is arranged to convert the received analog signals to digital signals. The digital signals are used for retrieving an azimuth angle of possible targets by simultaneously sampling and analyzing phase and amplitude of the received signals. The analysis is generally performed in one or more Digital Signal Processors (DSP) by means of Fast Fourier Transform (FFT) processing.

A vehicle radar system may be used for detecting other vehicles, fixed objects and pedestrians, where pedestrian protection will become of an increased importance. For detection of pedestrians, a radar system should be able to detect objects such as pedestrians at a sufficient distance and to classify detected objects as pedestrians if that is the case, being able to resolve a pedestrian from clutter.

Today, the FMCW signal is constituted by a relatively rapid sequence of ramps. This allows the phase of the RF signal to be tracked from one ramp to the next. However due to the high velocity of the system and other vehicles, combined with the relatively small wavelength of about 4 mm, the velocity of a target is often under-sampled. When travelling at a velocity corresponding to twice the Nyquist velocity, ground stationary objects and following targets are in the same Doppler bin, making it harder to see and distinguish slowly approaching targets.

This means that the velocity of a ground stationary object such as a guardrail can appear in the same range bin and the same Doppler bin as an approaching vehicle, thus making it difficult to separate them since the only distinguishing feature between the objects is then in the angle of arrival of the received signals.

It is thus a desire to provide a vehicle radar system where a ground stationary object can be distinguished from an approaching vehicle.

SUMMARY OF EXEMPLARY EMBODIMENTS OF THE INVENTION

The object of the present disclosure is thus to provide a vehicle radar system where a ground stationary object can be distinguished from an approaching vehicle.

This object is obtained by a vehicle radar system adapted to be placed in an ego vehicle and comprising a control unit and at least one transceiver arrangement arranged to generate and transmit an FMCW (Frequency Modulated Continuous Wave) signal. The transceiver arrangement is also arranged to receive reflected signals that have been reflected by one or more target objects where each target object has an associated determined target object velocity. The FMCW signal comprises a corresponding plurality of frequency ramps where each one of the frequency ramps has a certain duration time. The control unit is adapted to control the transceiver arrangement to generate at least two pluralities of ramps, where the ramps in each plurality of ramps are adapted to have a ramp period time that differs from the ramp period time in all other pluralities of ramps. The control unit is adapted to determine the ramp period times based on a determined ego vehicle velocity, the determined target object velocity, or a combination of both.

By having different pluralities of ramps, where each plurality of ramps has a ramp period time that differs from the ramp period time in all other pluralities of ramps, it is possible to distinguish a ground stationary object from an approaching vehicle when travelling at a velocity corresponding to twice the Nyquist velocity. If, for example, the Nyquist velocity is reduced, this results in that different objects can be perceived by the radar system to have different velocities, hence being in different Doppler bins. Furthermore, no azimuth jitter will be present.

According to some aspects of exemplary embodiments of the invention, the ramps in a first plurality of ramps are adapted to have a first ramp period time, and the ramps in another plurality of ramps are adapted to have another ramp period time that differs from the first ramp period time.

According to some aspects of exemplary embodiments of the invention, the ramps in the first plurality of ramps are adapted to have a first ramp duration time, and the ramps in another plurality of ramps are adapted to have another ramp duration time that differs from the first ramp duration time.

According to some aspects of exemplary embodiments of the invention, each plurality of ramps corresponds to a corresponding intermediate frequency (IF) sampling rate. The IF sampling rates are mutually different such that the number of samples for each ramp is kept constant.

This way, the number of samples for each ramp is kept constant which simplifies the (FFT).

According to some aspects of exemplary embodiments of the invention, the ramps in the first plurality of ramps are adapted to be separated by a first ramp delay time, and the ramps in another plurality of ramps are adapted to be separated by another ramp delay time that differs from the first ramp delay time.

According to some aspects of exemplary embodiments of the invention, the first plurality of ramps is adapted to run during a first radar cycle, and another plurality of ramps is adapted to run during a second radar cycle, following the first radar cycle.

According to some aspects of exemplary embodiments of the invention, the first plurality of ramps and the other plurality of ramps are adapted to run alternatingly during consecutive radar cycles.

According to some aspects of exemplary embodiments of the invention, each plurality of ramps is adapted to run during a separate part of a radar cycle.

According to some aspects of exemplary embodiments of the invention, a first plurality of ramps is adapted to run during a part of the radar cycle and another plurality of ramps is adapted to run during another part of the radar cycle.

According to some aspects of exemplary embodiments of the invention, the ramps in the pluralities of ramps are adapted to run in an interleaved manner according to a certain patter during each radar cycle.

This way, the present disclosure can be realized in many different ways.

According to some aspects, the pattern is randomized.

This way, the amplitude of incorrect Doppler spikes is lowered.

This object is obtained by methods that are associated with the above advantages.

BRIEF DESCRIPTION OF THE DRAWING

The present disclosure will now be described more in detail with reference to the appended drawings, where.

DETAILED DESCRIPTION

Figure 1:
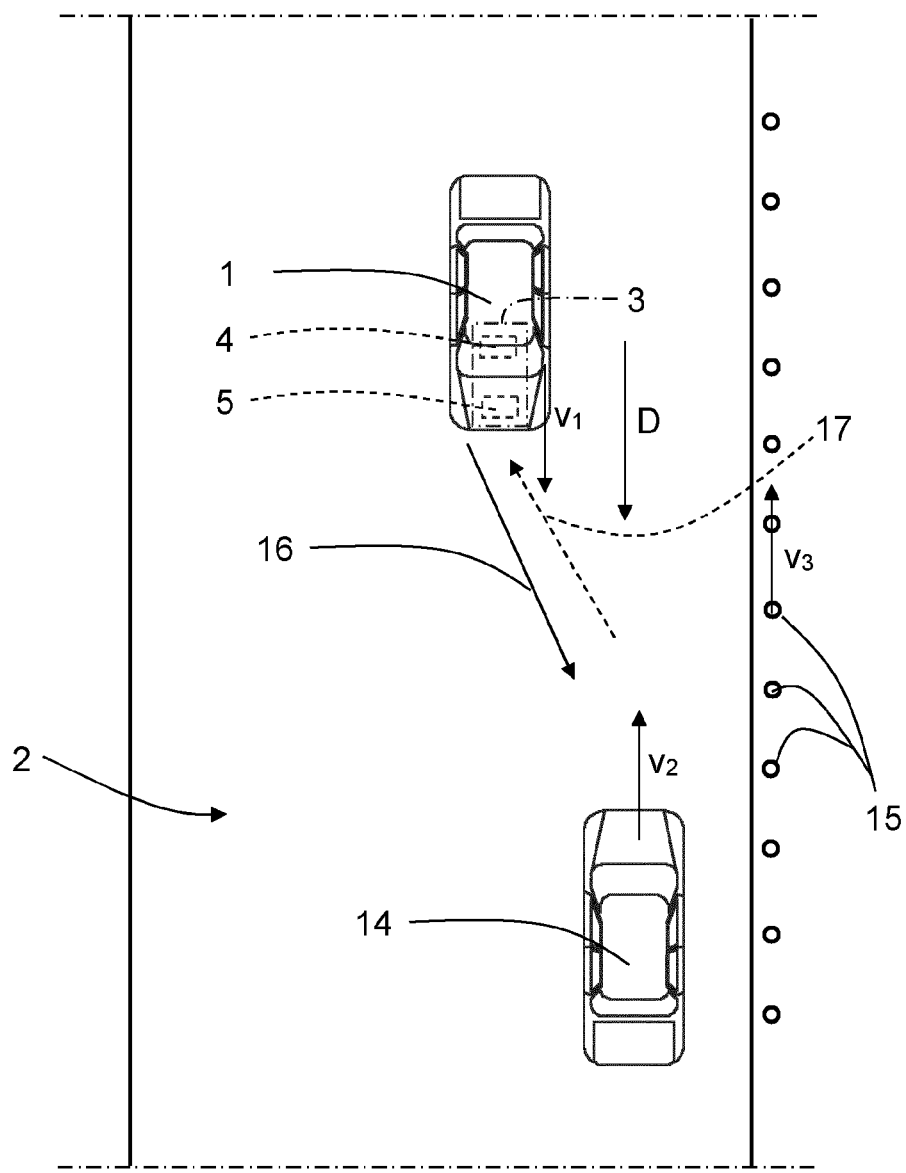
FIG. 1 shows a schematic top view of an ego vehicle and an approaching vehicle.

Aspects of exemplary embodiments of the invention will now be described more fully hereinafter with reference to the accompanying drawings. The different devices, systems, computer programs and methods disclosed herein can, however, be realized in many different forms and should not be construed as being limited to the aspects set forth herein. Like numbers in the drawings refer to like elements throughout.

The terminology used herein is for describing aspects of the disclosure only and is not intended to limit the invention. As used herein, the singular forms "a", "an" and "the" are intended to include the plural forms as well, unless the context clearly indicates otherwise.

FIG. 1 schematically shows a top view of an ego vehicle 1 arranged to run on a road 2 in a direction D, where the ego vehicle 1 comprises a vehicle radar system 3 which is arranged to distinguish and/or resolve single targets from the surroundings by transmitting signals 16 and receiving reflected signals 17 and using a Doppler effect in a previously well-known manner. The vehicle radar system 3 is arranged to provide azimuth angles of possible objects 14, 15, each having an associated determined target object velocity $v_2$, $v_3$, by simultaneously sampling and analyzing phase and amplitude of the received signals 17.

Figure 2:
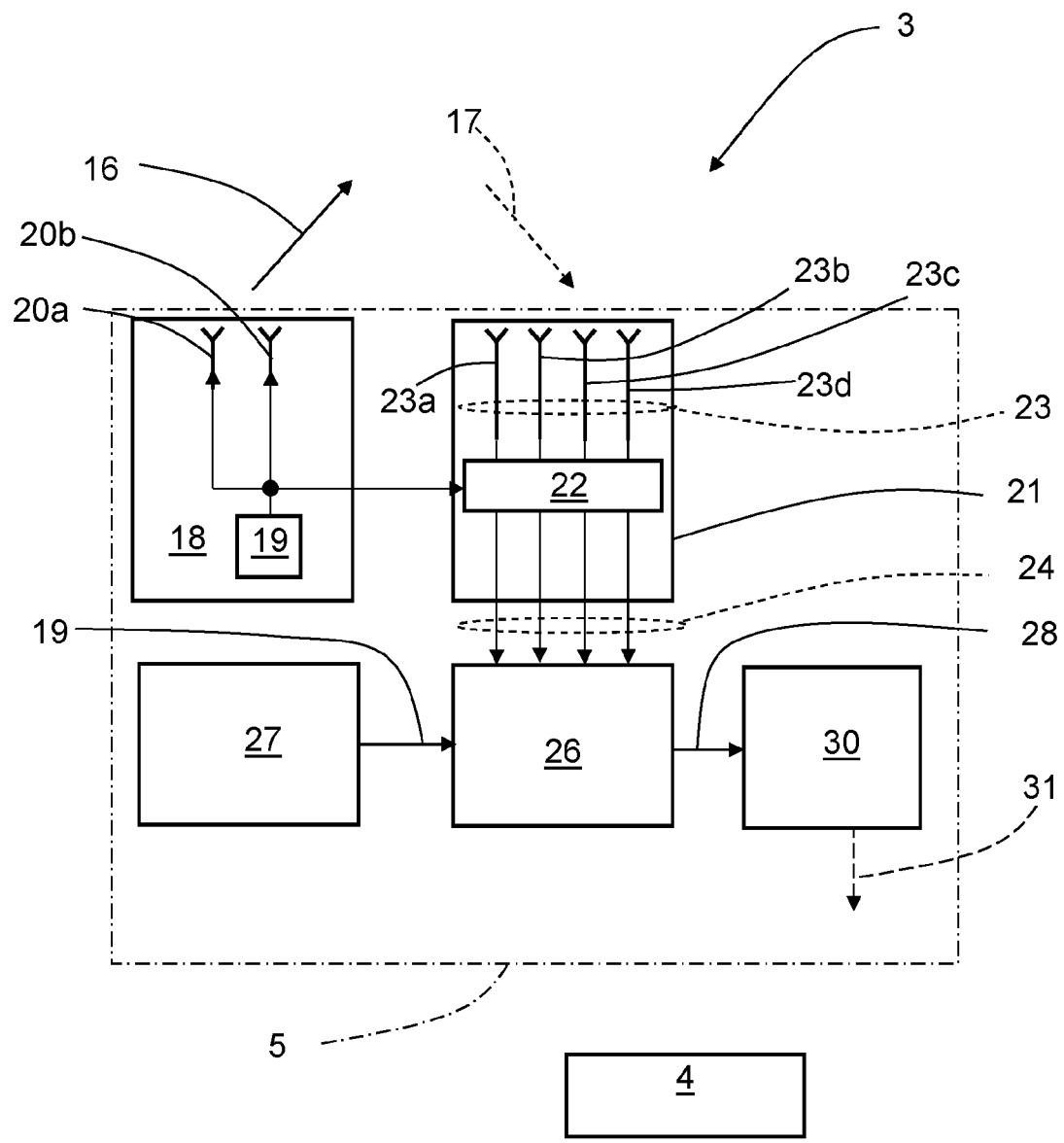
FIG. 2 shows a schematic view of a radar transceiver.

With reference to both FIG. 1 and FIG. 2, FIG. 2 showing a simplified schematic of a vehicle radar system 3 according to a first example, the vehicle radar system 3 comprises transceiver arrangement 5 that in turn comprises a transmitter arrangement 18 which in turn comprises a signal generator 19 that is arranged to generate FMCW (Frequency Modulated Continuous Wave) chirp signals of a previously known kind, comprising frequency ramps, a chirp signal being in the form of a continuous sinusoid where the frequency varies from a first low frequency to a second high frequency over the course of each ramp. The change in frequency from start to finish may for example be of the order of 1% of the starting frequency.

The transmitter arrangement 18 further comprises a first transmitter antenna arrangement 20a and a second transmitter antenna arrangement 20b, each transmitter antenna arrangement 20a, 20b either being constituted by one antenna element or by an array of antenna elements, and being arranged to transmit the chirp signal 16.

The transceiver arrangement 5 further comprises a receiver arrangement 21, which receiver arrangement 21 in turn comprises a receiver mixer 22 and a receiver antenna array 23, where the receiver antenna array 23 comprises four receiver antenna arrangements 23a, 23b, 23c, 23d. In the same way as for the transmitter antenna arrangements, each receiver antenna arrangement 23a, 23b, 23c, 23d may be constituted by one antenna element or by an array of antenna elements.

The reflected signals 17 are received by the receiver arrangement 21 via the receiver antenna arrangements 23a, 23b, 23c, 23d and are mixed with the generated chirp signal 16 in the receiver mixer 22, such that four corresponding IF (Intermediate Frequency) signals 24 are acquired. The frequency of the resulting IF signals relates to the target distance. The phase difference of the IF signal from one chirp to the next indicates the Doppler velocity. Each target appears as a sinusoid of a particular frequency F and phase $\phi$ in the IF signal. The phase $\phi$ is measured from the FFT since the phase of the bin corresponding to frequency F indicates the phase of that chirp.

The transceiver arrangement 5 further comprises an Analog to Digital Converter (ADC) arrangement 26 and a sampling and timing arrangement 27. The four corresponding IF signals 24 are transmitted from the receiver to the ADC arrangement 26 where the IF signals 24 are sampled at a certain predetermined sampling frequency $f_s$ and converted to digital signals 28, the sampling frequency $f_s$ being provided in the form of a sampling and timing signal 29 produced by the sampling and timing arrangement 27.

The transceiver arrangement 5 further comprises a DSP (Digital Signal Processor) arrangement 30 that is adapted for radar signal processing by means of a first FFT (Fast Fourier Transform) to convert the digital signals 28 to a range domain, and a second FFT to combine the results from successive chirp signal ramps into the Doppler domain. The two-dimensional spectrum of the Range-Doppler matrices that results are forwarded for further processing as indicated with a dashed arrow 31. The vehicle radar system 3 suitably comprises a main control unit 4 that is arranged to control the working of certain components in the vehicle radar system 3.

Figure 3:
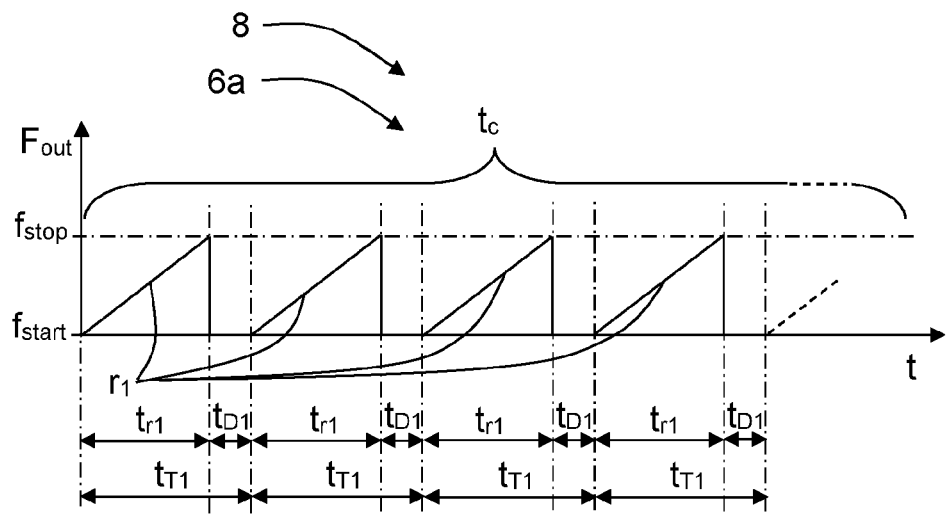
FIG. 3 shows a first chirp signal.

As shown in FIG. 3, there is a first chirp signal 6a with frequency on the Y-axis and time on the X-axis. The frequency varies from a first frequency $f_{start}$ to a second frequency $f_{stop}$ over the course of each ramp, where the magnitude of the first frequency $f_{start}$ falls below the magnitude of the second frequency $f_{stop}$. The chirp signal comprises a first plurality of frequency ramps 6a that comprises first ramps $r_1$ that run during a first type radar cycle 8 that has a duration of a cycle time $t_c$.

In this context, a radar cycle is one observation phase during which the vehicle radar system 6 is arranged to acquire data, process said data on several signal processing levels and to send out available results. This can be a fixed time interval (i.e. 40 to 60 milliseconds), or it can be a dynamic time interval depending on environment conditions and processing load.

Each first ramp $r_1$ lasts a certain first ramp duration time tri, and between two consecutive first ramps $r_1$ there is a first ramp period time $t_{T1}$ that is constituted by the first ramp duration time $t_{r1}$ and a first delay time $t_{D1}$, where the first delay time $t_{D1}$ separates two consecutive first ramps $r_1$.

In FIG. 1, there is an approaching target vehicle 14 as well as guardrail poles 15 that form target objects. In some cases, a vehicle radar system may have difficulties when separating the target vehicle 14 from the guardrail poles 15. According to some aspects, if for example there is a ramp period time of 50 μs, and the radar signal wavelength is 4 mm, due to the round-trip distance the twice Nyquist velocity is given by: 2 mm/50 μs=40 m/s. This means the radar system 3 can report in the range −20 m/s to +20 m/s which approximately is equivalent to −72 kph to +72 kph. Outside that range, the apparent Doppler will alias or wrap-around, which is undesirable. This is due to that the phase difference from ramp to ramp cannot be ambiguously determined due to the present sampling rate.

If the ego vehicle velocity $v_1$ is 144 kph as determined either from odometer, GPS (Global Positioning System) or other GNSS (Global Navigation Satellite System), or from observing ground-stationary objects, the guardrails poles have a relative velocity $v_3$ that will alias to 0 kph. If the target vehicle velocity $v_2$ is 144 kph it has an apparent radial velocity of +1 kph and cannot be easily separated from the guardrail poles 15 using the Doppler velocity as perceived by the radar system 3. This means that when the ego vehicle 1 and a road border have the same range, the targets 14, 15 will merge and target azimuth angle as perceived by the radar system 3 will jitter around.

Figure 4:
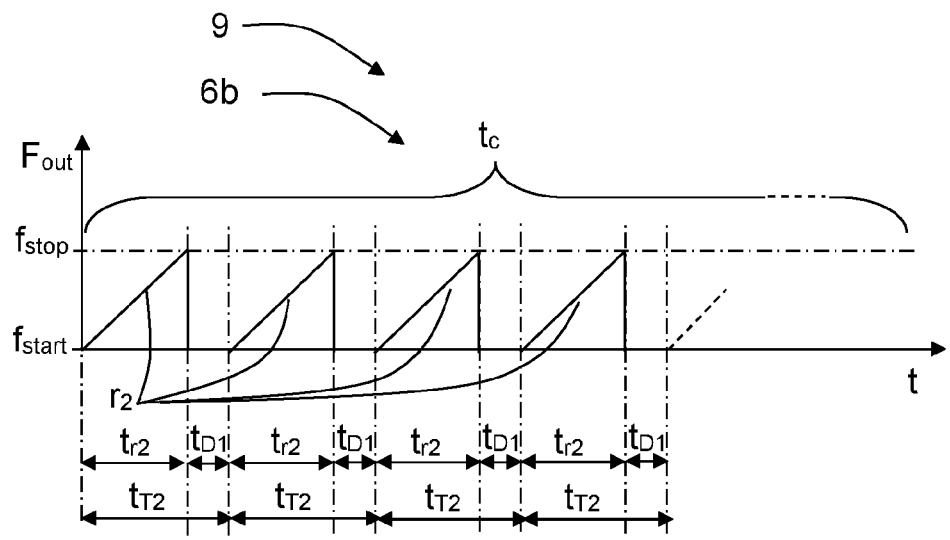
FIG. 4 shows a second chirp signal.

In FIG. 4, there is a second chirp signal that comprises a second plurality of frequency ramps 6b that comprises second ramps $r_2$ that run during a second type radar cycle 9 that has a duration of the cycle time $t_c$. Each second ramp $r_2$ lasts a certain second ramp duration time $t_{r2}$, and between two consecutive second ramps $r_2$ there is a second ramp period time $t_{T2}$ that is constituted by the second ramp duration time $t_{r2}$ and the first delay time $t_{D1}$.

According to the present disclosure, the control unit 4 is adapted to control the transceiver arrangement 5 to generate the two pluralities of ramps 6a, 6b, where the ramps $r_1$ in the first plurality of ramps 6a are adapted to have a first ramp period time $t_{T1}$ that differs from a second ramp period time $t_{T2}$ in the second plurality of ramps 6b.

The first plurality of ramps 6a is adapted to run during the first type radar cycle 8, and the second plurality of ramps 6b is adapted to run during the second type radar cycle 9, following the first type radar cycle 8.

According to some aspects, the first plurality of ramps 6a and the second plurality of ramps 6b are adapted to run alternatingly during consecutive radar cycles 8, 9.

Generally, the ramps in one plurality of ramps, in this example the first ramps $r_1$ in the first plurality of ramps 6a, are adapted to have a ramp period time that differs from the ramp period time in all other pluralities of ramps. In this example, the first ramp period time $t_{T1}$ differs from the second ramp period time $t_{T2}$. The control unit 4 is adapted to determine the ramp period times $t_{T1}$, $t_{T2}$, based on a determined ego vehicle velocity $v_1$, a determined target object velocity $v_2$, $v_3$ or a combination of both.

When the ramp period time increases, for example from 50 μs to 60 μs, either for all ramps or for a sub-block of ramps or alternately in adjacent cycles, the Nyquist velocity is reduced which results in that the target vehicle 14 and the guardrail poles 15 are perceived by the radar system 3 to have different velocities, hence being in different Doppler bins and no azimuth jitter will be present.

A change of ramp period time can be accomplished in many other ways, a number of examples will be provided below.

Figure 5:
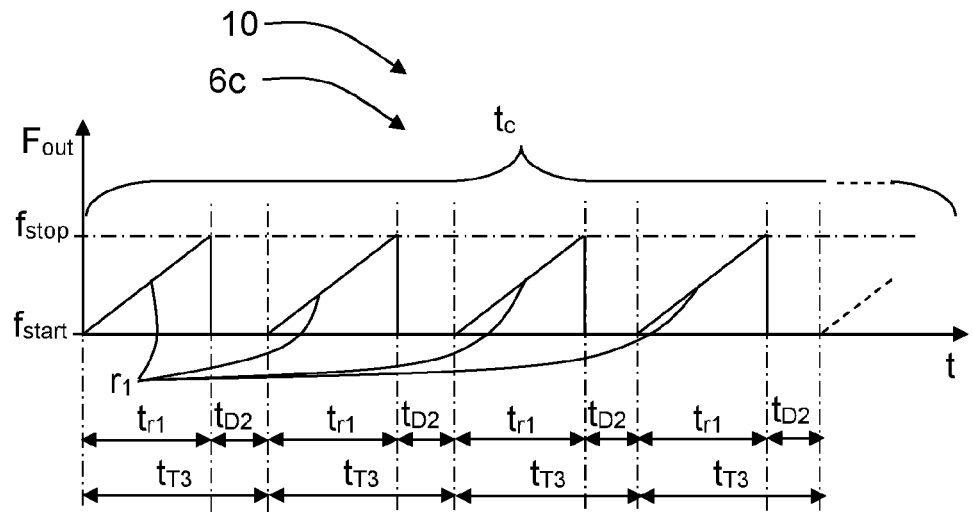
FIG. 5 shows a third chirp signal.

With reference to FIG. 5, according to some aspects, there is a third chirp signal that comprises a third plurality of frequency ramps 6c comprising the first ramps $r_1$ that run during a third type radar cycle 10 that has a duration of the cycle time $t_c$. Between two consecutive first ramps $r_1$ there is a third ramp period time $t_{T3}$ that is constituted by the first ramp duration time $t_{r1}$ and a second delay time $t_{D2}$.

The third plurality of frequency ramps 6c can be run cycle-wise, interleaved with either one of the first plurality of frequency ramps 6a and the second plurality of frequency ramps 6b, or interleaved with both these pluralities of frequency ramps 6a, 6b.

There can be other types of varieties, for example there can be a fourth ramp period time $t_{T4}$ that is constituted by the second ramp duration time $t_{r2}$ and the second delay time $t_{D2}$. Other alternatives with different ramp duration times and delay times are of course conceivable.

The pluralities of frequency ramps 6a, 6b, 6c can be run cycle-wise as described above, but can also run during one radar cycle, such that during one cycle time to there are two or more different pluralities of frequency ramps 6a, 6b, 6c with mutually different ramp period times.

Figure 6:
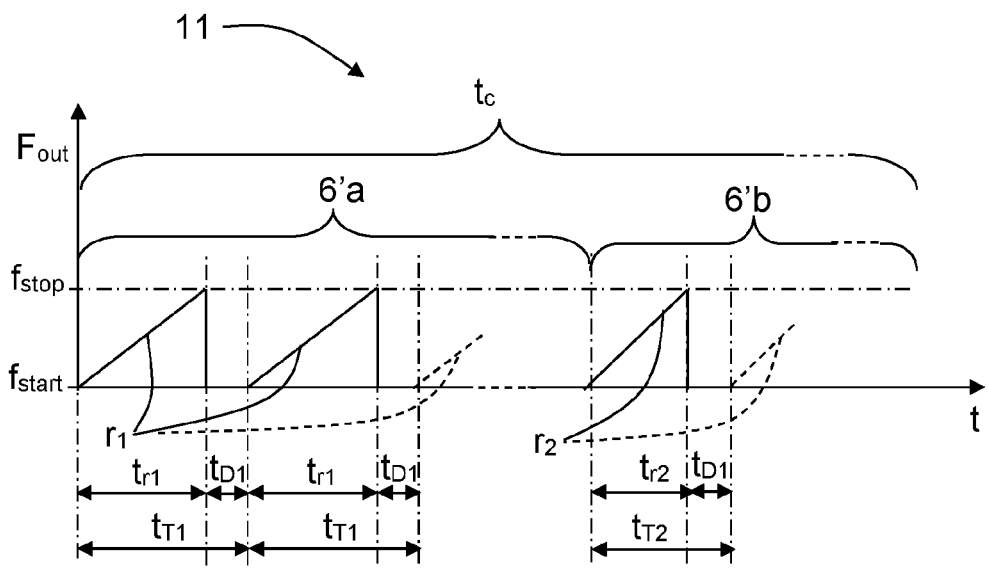
FIG. 6 shows a fourth chirp signal.

This is illustrated in FIG. 6 where there is a first sub-plurality of frequency ramps 6'a and a second sub-plurality of frequency ramps 6'b which run interleaved with each other one or more times during the radar cycle time $t_c$. The first sub-plurality of frequency ramps 6'a comprises a part of the first sub-plurality of frequency ramps 6a, and the second sub-plurality of frequency ramps 6'b comprises a part of the second sub-plurality of frequency ramps 6b.

Figure 7:
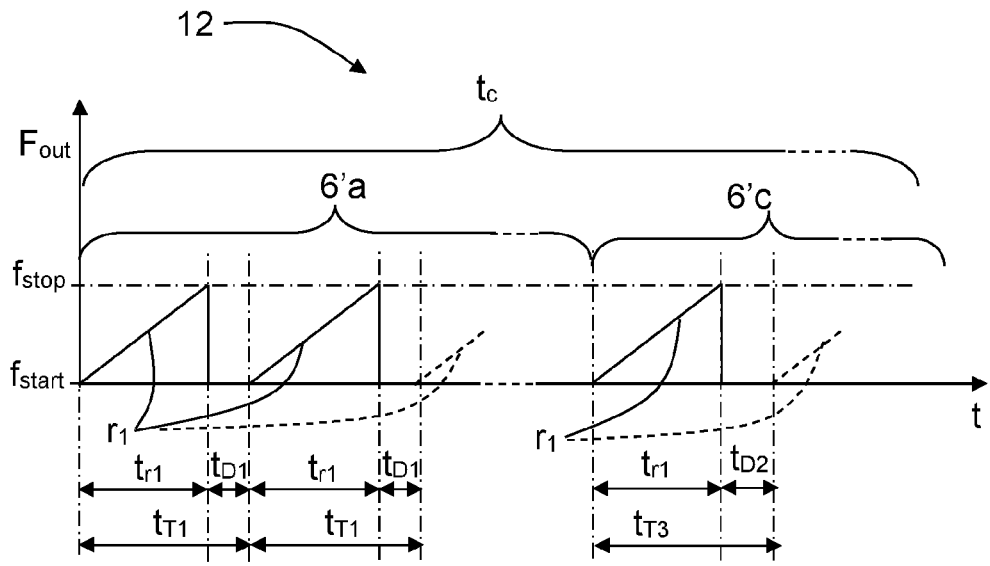
FIG. 7 shows a fifth chirp signal.

An alternative is illustrated in FIG. 7 where the first sub-plurality of frequency ramps 6'a and a third sub-plurality of frequency ramps 6'c are run interleaved with each other one or more times during the radar cycle time $t_c$. The third sub-plurality of frequency ramps 6'c comprises a part of the third sub-plurality of frequency ramps 6c.

All three sub-pluralities of frequency ramps 6'a, 6'b, 6'c can be run interleaved with each other one or more times during the radar cycle time $t_c$.

This is repeated from radar cycle to radar cycle, and the temporal positions and lengths of the sub-pluralities of frequency ramps 6'a, 6'b 6'c can vary from radar cycle to radar cycle, as well as within each radar cycle for the case of one or more sub-pluralities of frequency ramps 6'a, 6'b 6'c are repeated with one radar cycle. All such variations can be periodic, predetermined or stochastic.

Figure 8:
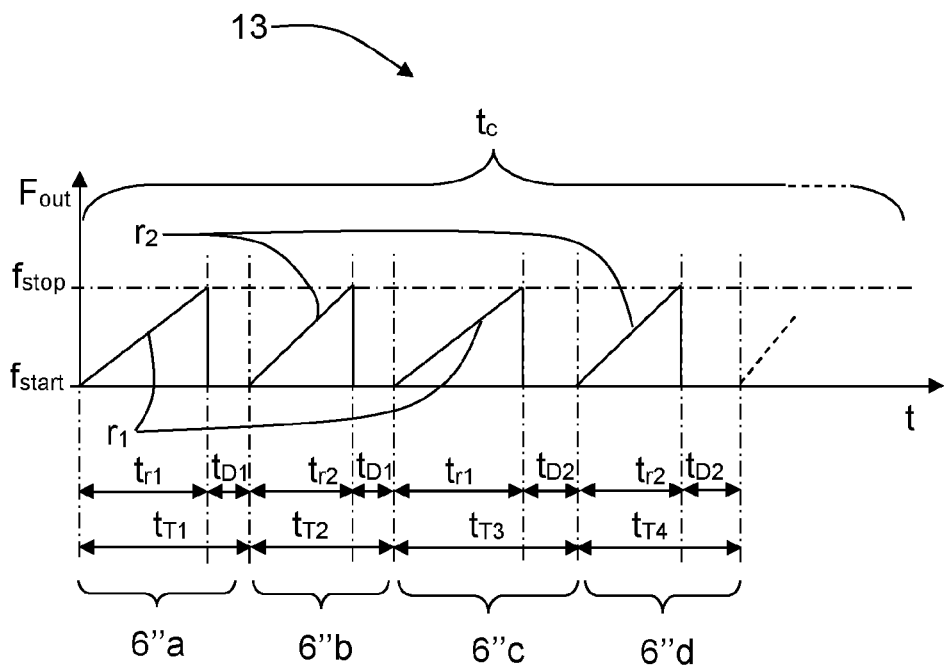
FIG. 8 shows a sixth chirp signal.

With reference to FIG. 8, according to some aspects of exemplary embodiments of the invention, there is a plurality of sub-pluralities of frequency ramps 6"a, 6"b 6"c, 6"d, where every ramp in these sub-plurality of frequency ramps 6"$a$, 6"$b$ 6"$c$, 6"$d$ run interleaved with the other ramps in a periodic, predetermined or stochastic manner.

The first sub-plurality of frequency ramps 6"$a$ comprises ramps having the first period time $t_{T1}$, the second sub-plurality of frequency ramps 6"$b$ comprises ramps having the second period time $t_{T2}$, the third sub-plurality of frequency ramps 6"$c$ comprises ramps having the third period time $t_{T3}$, and the fourth sub-plurality of frequency ramps 6"$d$ comprises ramps having the fourth period time $t_{T4}$. In FIG. 8, only one ramp is shown for each sub-plurality of frequency ramps 6"$a$, there are of course many more during the radar cycle time to, and they can be mixed in any suitable way. There can of course be more or less different types of sub-pluralities of frequency ramps 6"$a$, 6"$b$ 6"$c$, 6"$d$, and the mixing of the ramps can be the same, or differ, from radar cycle to radar cycle.

According to some aspects, during a radar cycle, there can be ramps of the same ramp duration time tri, but where the delay time between the ramps changes in a periodic, predetermined or stochastic manner.

For example, previously there were 128 ramps in a radar cycle that resulted in an array of length 128 for FFT processing. If, with altered ramp period times, the shortest ramp period time is 50 μs and the average ramp period time is 80 μs there are 128 values but an array of length 128×8=1024. This means that values will be zero, hence the FFT will take longer but there will be no Doppler ambiguity as the Doppler Nyquist has been extended by a factor of 5 compared to the original 50 μs ramp period time.

It should be noted that having a constant altered ramp period time of for example 80 μs results in a reduced Doppler Nyquist; the insight of the present disclosure lies in changing the ramp period time between radar cycles and/or in radar cycles.

Motionless targets such as the guardrail poles 15 will always be perceived as motionless by the radar system 3, while moving targets will be perceived to have different relative velocities by the radar system 3, and with this knowledge, the real relative velocity of such a moving target can be calculated.

A stochastic change of ramp period time can according to some aspects be obtained by means of a computer Monte Carlo simulation that attempts various sets randomly, each time checking the sidelobes.

According to some aspects, the array of 1024 values may be windowed with a symmetric or asymmetric windowing function in order to lower the sidelobes. Windowing applies an amplitude weighting to the ramps, so the first and last ramps have lower amplitude than the center ramps. This results in better resolution after the FFT since it lowers sidelobes, which may be confused as other targets.

However, since the input vector is now sparse, it may be unsuitable to use a symmetric window like a Hamming window. Instead, a window that has fairly random values should be used in order to lower the sidelobes that are created by the sparse nature of the signal. This is enabled by using an FFT where the amplitude from the ramps are all equally weighted by value '1'. By using different weightings/window, such as 0.9, 1, 0.7, 0.8, etc. to the ramps before they are put into the sparse vector the sidelobes can be lowered. The optimum combinations of values can be found by means of iterative searches.

The best windowing function to use will depend on the exact set of ramp period times, and can be determined by using an adaptive computer algorithm that iteratively can lower all sidelobes.

According to some aspects of exemplary embodiments of the invention, the main control unit 4 uses the velocity $v_1$ of the ego vehicle 1 to determine if, and possibly to which extent, changes are necessary to the ramp period times. The main control unit 4 may typically operate the radar transceiver arrangement 5 with the shortest possible ramp-to-ramp timing, but as the velocity increases such that the apparent aliased velocity of ground stationary objects would such cause approaching target vehicles 14 to be hidden, the ramp-to-ramp timing can be changed accordingly. The main control unit 4 can ascertain the velocity $v_1$ of the ego vehicle 1 from information such as GPS, by measuring the Doppler velocity of fixed targets or by observing the rate of change of range of fixed targets. The main control unit 4 can also receive velocity information from the vehicle's tachometer.

Alternatively, if a target object in the form of a distant target vehicle 14 that has been detected and is approaching quickly, the main control unit 4 is adapted to ensure that ground stationary objects 15 do not alias to appear in the same Doppler bin as that fast-approaching vehicle 14.

According to some aspects of exemplary embodiments of the invention, the main control unit 4 may decide that the best approach is to use a randomized timing of ramps that appear at random time positions on a fixed timing grid. In such cases, ground stationary objects such as the guard rail poles 15 are not aliased, but they may create sidelobes across a range of velocities depending on the selection of the set of random ramp timings.

According to some aspects of exemplary embodiments of the invention, the main control unit 4 may ascertain the velocity of the ego vehicle 1 from information such as GPS or by measuring the Doppler of fixed targets or by observing the rate of change of range of fixed targets. It may also receive velocity information from the vehicle's tachometer.

Figure 9:
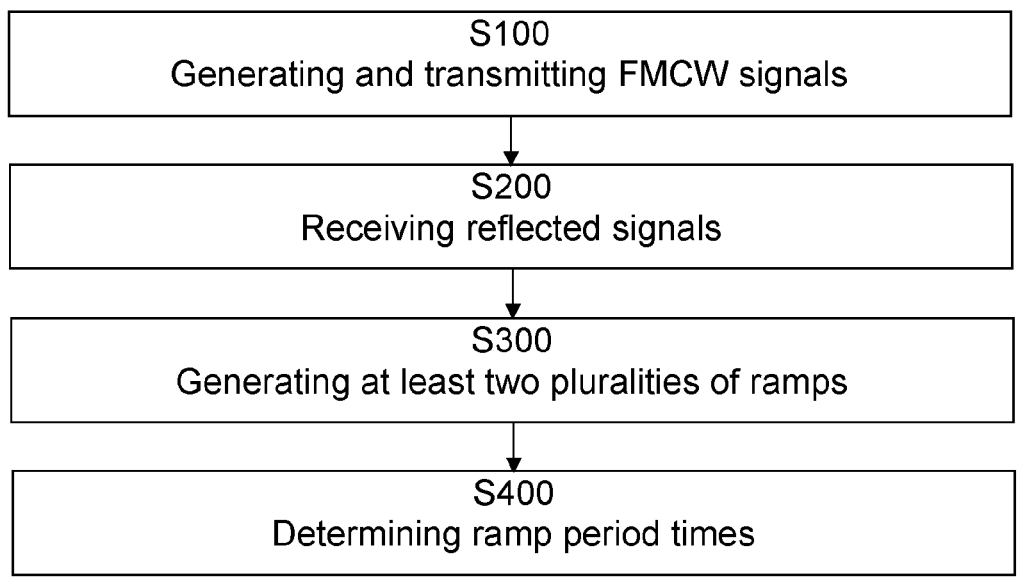
FIG. 9 shows a flowchart for methods according to the present disclosure.

With reference to FIG. 9, the present disclosure also relates to a method in a vehicle radar system 3 used in an ego vehicle 1. The method comprises generating and transmitting S100 FMCW, Frequency Modulated Continuous Wave, signals 6; 6$a$, 6'$a$; 6$b$, 6'$b$ and receiving S200 reflected signals 7 that have been reflected by one or more target objects 14, 15, each target object 14, 15 having an associated determined target object velocity $v_2$, $v_3$. The FMCW signals 6 comprise a corresponding plurality of frequency ramps $r_1$, $r_2$ where each one of the frequency ramps $r_1$, $r_2$ has a certain duration time $t_{r1}$, $t_{r2}$. The method further comprises generating S300 at least two pluralities 6$a$, 6'$a$; 6$b$, 6'$b$, 6$c$, 6'$c$ of ramps $r_1$, $r_2$.

The ramps $r_1$ in each plurality 6$a$, 6'$a$ of ramps $r_1$ are adapted to have a ramp period time $t_{T1}$ that differs from the ramp period time $t_{T2}$, $t_{T3}$, $t_{T4}$ in all other pluralities 6$b$, 6'$b$, 6$c$, 6'$c$ of ramps $r_1$, $r_2$.

The method also comprises determining S400 the ramp period times $t_{T1}$, $t_{T2}$, $t_{T3}$, $t_{T4}$ based on a determined ego vehicle velocity $v_1$, the determined target object velocity $v_2$, $v_3$, or a combination of both.

According to some aspects of exemplary embodiments of the invention, the ramps $r_1$ in a first plurality 6$a$, 6'$a$ of ramps $r_1$ have a first ramp period time $t_{T1}$, and the ramps $r_2$ in another plurality 6$b$, 6'$b$, 6$c$ of ramps $r_2$ have another ramp period time $t_{T2}$, $t_{T3}$, $t_{T4}$ that differs from the first ramp period time $t_{T1}$.

According to some aspects of exemplary embodiments of the invention, the first plurality 6$a$ of ramps $r_1$ and the other plurality 6$b$, 6$c$ of ramps $r_1$, $r_2$ either run alternatingly during consecutive radar cycles 8, 9, or during a separate part of a radar cycle 11, 12.

The present disclosure is not limited to the examples above, but may freely within the scope of the appended claims. For example, the ramp period times $t_{T1}$, $t_{T2}$, $t_{T3}$, $t_{T4}$ are restricted to an integer multiple of a fixed time base period.

Generally, the present disclosure relates to a vehicle radar system 3 adapted to be placed in an ego vehicle 1 and comprising a control unit 4 and at least one transceiver arrangement 5 arranged to generate and transmit an FMCW (Frequency Modulated Continuous Wave) signal 6; 6a, 6'a; 6b, 6'b. The transceiver arrangement 5 is also arranged to receive reflected signals 7 that have been reflected by one or more target objects 14, 15, each target object 14, 15 having an associated determined target object velocity $v_2$, $v_3$. The FMCW signal 6 comprises a corresponding plurality of frequency ramps $r_1$, $r_2$, where each one of the frequency ramps $r_1$, $r_2$ has a certain duration time $t_{r1}$, $t_{r2}$. The control unit 4 is adapted to control the transceiver arrangement 5 to generate at least two pluralities 6a, 6'a; 6b, 6'b, 6c, 6'c of ramps $r_1$, $r_2$, where the ramps $r_1$ in each plurality 6a, 6'a of ramps $r_1$ are adapted to have a ramp period time $t_{T1}$ that differs from the ramp period time $t_{T2}$, $t_{T3}$, $t_{T4}$ in all other pluralities 6b, 6'b, 6c, 6'c of ramps $r_1$, $r_2$. The control unit 4 is adapted to determine the ramp period times $t_{T1}$, $t_{T2}$, $t_{T3}$, $t_{T4}$ based on a determined ego vehicle velocity $v_1$, the determined target object velocity $v_2$, $v_3$, or a combination of both.

According to some aspects of exemplary embodiments of the invention, the ramps $r_1$ in a first plurality 6a, 6'a of ramps $r_1$ are adapted to have a first ramp period time $t_{T1}$. The ramps $r_2$ in another plurality 6b, 6'b, 6'c of ramps $r_2$ are adapted to have another ramp period time $t_{T2}$, $t_{T3}$, $t_{T4}$ that differs from the first ramp period time $t_{T1}$.

According to some aspects of exemplary embodiments of the invention, the ramps $r_1$ in the first plurality 6a, 6'a of ramps $r_1$ are adapted to have a first ramp duration time $t_{r1}$. The ramps $r_2$ in another plurality 6b, 6'b of ramps $r_2$ are adapted to have another ramp duration time $t_{r2}$ that differs from the first ramp duration time $t_{r1}$.

According to some aspects of exemplary embodiments of the invention, each plurality 6a, 6'a; 6b, 6'b, 6c, 6'c of ramps $r_1$, $r_2$ corresponds to a corresponding intermediate frequency, IF, sampling rate, where the IF sampling rates are mutually different such that the number of samples for each ramp $r_1$, $r_2$ is kept constant.

According to some aspects of exemplary embodiments of the invention, the ramps $r_1$ in the first plurality 6a, 6'a of ramps $r_1$ are adapted to be separated by a first ramp delay time $t_{D1}$. The ramps $r_1$ in another plurality 6c, 6'c of ramps $r_1$, $r_2$ are adapted to be separated by another ramp delay time $t_{D2}$ that differs from the first ramp delay time $t_{D1}$.

According to some aspects of exemplary embodiments of the invention, the first plurality 6a of ramps $r_1$ is adapted to run during a first radar cycle 8, and another plurality 6b of ramps $r_1$, $r_2$ is adapted to run during a second radar cycle 9, 10, following the first radar cycle 8.

According to some aspects of exemplary embodiments of the invention, the first plurality 6a of ramps $r_1$ and the other plurality 6b, 6c of ramps $r_1$, $r_2$ are adapted to run alternatingly during consecutive radar cycles 8, 9.

According to some aspects of exemplary embodiments of the invention, each plurality of ramps $r_1$, $r_2$ is adapted to run during a separate part of a radar cycle 11, 12.

According to some aspects of exemplary embodiments of the invention, a first plurality 6'a of ramps $r_1$ is adapted to run during a part of the radar cycle 11, 12 and another plurality 6'b, 6'c of ramps $r_1$, $r_2$ is adapted to run during another part of the radar cycle 11, 12.

According to some aspects of exemplary embodiments of the invention, the ramps $r_1$, $r_2$ in the pluralities of ramps $r_1$, $r_2$ are adapted to run in an interleaved manner according to a certain patter during each radar cycle 13.

According to some aspects of exemplary embodiments of the invention, the pattern is randomized.

While the above description constitutes the preferred embodiment of the present invention, it will be appreciated that the invention is susceptible to modification, variation and change without departing from the proper scope and fair meaning of the accompanying claims.

The invention claimed is:

1. A vehicle radar system adapted to be placed in an ego vehicle and comprising:
   a control unit and at least one transceiver arrangement arranged to generate and transmit a frequency modulated continuous wave signal and to receive reflected signals that have been reflected by one or more target objects, each of the target-objects having an associated determined target object velocity where the frequency modulated continuous wave signal comprises a corresponding plurality of frequency ramps, where each of the frequency ramps has a certain duration time and further comprising that the control unit is adapted to control the transceiver arrangement to generate at least two pluralities of the ramps, where the ramps in each of the at least two pluralities of the ramps are adapted to have a ramp period time that differs from the ramp period time in all other pluralities of ramps, and where the control unit is adapted to determine the ramp period times based on a determined ego vehicle velocity, the determined target object velocity or a combination of both the determined ego vehicle velocity and the determined target object velocity,
   wherein the ramps in the at least two pluralities of the ramps are adapted to run in an interleaved manner according to a pattern during each radar cycle, and
   wherein the pattern is randomized.

2. The vehicle radar system according to claim 1, wherein the ramps in a first plurality of the ramps are adapted to have a first ramp period time, and where the ramps in another plurality of the ramps are adapted to have another ramp period time that differs from the first ramp period time.

3. The vehicle radar system according to claim 2, wherein the ramps in the first plurality of the ramps are adapted to have a first ramp duration time, and where the ramps in the another plurality of the ramps are adapted to have another ramp duration time that differs from the first ramp duration time.

4. The vehicle radar system according to claim 3, wherein each of the at least two pluralities of the ramps corresponds to a corresponding intermediate frequency sampling rate, where the sampling rates are mutually different such that a number of samples for each ramp is kept constant.

5. The vehicle radar system according to claim 3, wherein the ramps in the first plurality of the ramps are adapted to be separated by a first ramp delay time, and where the ramps in the another plurality of the ramps are adapted to be separated by another ramp delay time that differs from the first ramp delay time.

6. The vehicle radar system according to claim 3, wherein the first plurality of the ramps is adapted to run during a first radar cycle, and another plurality of ramps is adapted to run during a second radar cycle, following the first radar cycle.

7. The vehicle radar system according to claim 6, wherein the first plurality of the ramps and the other plurality of ramps are adapted to run alternatingly during consecutive radar cycles.

8. The vehicle radar system according to claim 2, wherein each plurality of ramps is adapted to run during a separate part of a radar cycle.

9. The vehicle radar system according to claim 8, wherein the first plurality of the ramps is adapted to run during a part of the radar cycle and where the another plurality of the ramps is adapted to run during another part of the radar cycle.

10. The vehicle radar system according to claim 1, wherein the ramp period times are restricted to an integer multiple of a fixed time base period.

11. A method in a vehicle radar system used in an ego vehicle comprising:
   generating and transmitting frequency modulated continuous wave signals; and
   receiving reflected signals that have been reflected by one or more target objects, each target object having an associated determined target object velocity, where the frequency modulated continuous wave signals comprise a corresponding plurality of frequency ramps where each one of the frequency ramps has a certain duration time,
   generating at least two pluralities of ramps, where the ramps in each of the at least two pluralities of the ramps are adapted to have a ramp period time that differs from the ramp period time-in all other pluralities of ramps, and
   determining the ramp period times based on a determined ego vehicle velocity, the determined target object velocity, or a combination of both the determined ego vehicle velocity and the determined target object velocity,
   wherein the ramps in the at least two pluralities of the ramps are adapted to run in an interleaved manner according to a pattern during each radar cycle, and wherein the pattern is randomized.

12. The method according to claim 11, wherein the ramps in a first plurality of ramps have a first ramp period time, and where the ramps in another plurality of ramps have another ramp period time that differs from the first ramp period time.

13. The method according to claim 12, wherein the first plurality of ramps and the other plurality of ramps either run alternatingly during consecutive radar cycles, or during a separate part of a radar cycle.

14. A vehicle radar system adapted to be placed in an ego vehicle and comprising:
   a control unit and at least one transceiver arrangement arranged to generate and transmit a frequency modulated continuous wave signal and to receive reflected signals that have been reflected by one or more target objects, each of the target objects having an associated determined target object velocity where the frequency modulated continuous wave signal comprises a corresponding plurality of frequency ramps, where each of the frequency ramps has a certain duration time,
   wherein the control unit is adapted to control the transceiver arrangement to generate at least three pluralities of the ramps, where the ramps in each of the at least three pluralities of the ramps have at least one of: a ramp period, or a ramp duration time that is different from a corresponding ramp period or ramp duration time in all other pluralities of ramps, and where the control unit is adapted to determine the at least one of the ramp period or the ramp duration time based on: a determined ego vehicle velocity, the determined target object velocity, or a combination of both the determined ego vehicle velocity and the determined target object velocity, and
   wherein each ramp in the at least three pluralities of the ramps is interleaved with ramps of a different one of the at least three pluralities of the ramps.

15. The vehicle radar system according to claim 14, wherein the ramps in each of the at least three pluralities of the ramps have ramp periods that are different from the ramp period in all the other pluralities of ramps.

16. The vehicle radar system according to claim 14, wherein the ramps in each of the at least three pluralities of the ramps have ramp durations that are different from the ramp duration in all the other pluralities of ramps.

* * * * *